(12) United States Patent
Ishii

(10) Patent No.: US 7,366,968 B2
(45) Date of Patent: Apr. 29, 2008

(54) DATA PROCESSING APPARATUS, AND ITS PROCESSING METHOD, PROGRAM PRODUCT AND MOBILE TELEPHONE APPARATUS

(75) Inventor: Daiji Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 494 days.

(21) Appl. No.: 11/088,883

(22) Filed: Mar. 25, 2005

(65) Prior Publication Data

US 2005/0232203 A1 Oct. 20, 2005

(30) Foreign Application Priority Data

Mar. 31, 2004 (JP) ............... 2004-101823

(51) Int. Cl.
*H04L 1/16* (2006.01)

(52) U.S. Cl. ............... 714/751
(58) Field of Classification Search ............... 714/751
See application file for complete search history.

(56) References Cited

U.S. PATENT DOCUMENTS

| | | | |
|---|---|---|---|
| 6,381,669 B1 * | 4/2002 | Chudnovsky et al. | 711/5 |
| 6,392,572 B1 * | 5/2002 | Shiu et al. | 341/81 |
| 6,434,203 B1 * | 8/2002 | Halter | 375/341 |
| 6,603,412 B2 * | 8/2003 | Gatherer et al. | 341/61 |
| 6,678,843 B2 * | 1/2004 | Giulietti et al. | 714/701 |
| 6,700,867 B2 | 3/2004 | Classon et al. | |
| 6,757,756 B1 * | 6/2004 | Lanteigne et al. | 710/52 |
| 6,775,800 B2 * | 8/2004 | Edmonston et al. | 714/755 |
| 6,988,154 B2 * | 1/2006 | Latta | 710/240 |
| 7,035,355 B2 * | 4/2006 | Lais et al. | 375/341 |
| 2002/0119803 A1 * | 8/2002 | Bitterlich et al. | 455/552 |
| 2003/0138059 A1 | 7/2003 | Xu et al. | |
| 2003/0167460 A1 * | 9/2003 | Desai et al. | 717/151 |
| 2005/0044327 A1 * | 2/2005 | Howard et al. | 711/147 |
| 2005/0166129 A1 * | 7/2005 | Yano et al. | 714/797 |
| 2006/0092973 A1 * | 5/2006 | Petrovic et al. | 370/469 |

FOREIGN PATENT DOCUMENTS

| JP | 2000-173261 | 6/2000 |
|---|---|---|
| JP | 2003-140964 | 5/2003 |

OTHER PUBLICATIONS

Hoogendoorn, C. et al., "Reduction of Memory Interference in Multiprocessor Systems", Proceedings 4th Annual Symposium on Computer Architecture, 1977, pp. 179-183.*

(Continued)

*Primary Examiner*—Stephen M. Baker
(74) *Attorney, Agent, or Firm*—Whitham Curtis Christofferson & Cook, PC

(57) ABSTRACT

A data processing apparatus capable of preventing contention of memory access between the HARQ synthesis and rate dematching in the HARQ processing using two or more single-port memories is provided. A buffer includes two physical memories. One of the physical memories is used as an even address memory, and the other is used as an odd address memory. With respect to access to the buffer conducted by the HARQ synthesis and rate dematching, access control is conducted so as to make the rate dematching access the odd address memory when the HARQ synthesis accesses the even address memory.

11 Claims, 19 Drawing Sheets

OTHER PUBLICATIONS

Rettberg, R., et al., "Contention is No Obstacle to Shared-Memory Multiprocessing", Communications of the ACM, Dec. 1986, vol. 29, No. 12, pp. 1202-1212.*

Harper, D. III, "Reducing Memory Contention in Shared Memory Multiprocessors", Proceeding 18th Annual International Symposium on Computer Architecture, 1991, pp. 66-73.*

Seznec, A., et al., "Interleaved Parallel Schemes: improving memory throughput on supercomputers", Proceedings 19th Annual International Symposium on Computer Architecture, 1992, pp. 246-255.*

Sakakibara, T., et al., "Scalable Parallel Memory Architecture with a Skew Scheme", Proceedings 7th International Conference on Supercomputing, 1993, pp. 157-166.*

Notification of First Office Action, Patent Office of the People's Republic of China, SPI051210-62, Application No. 2005100562, NEC Corporation, Date of Issuing: Oct. 13, 2006, Chinese lang. pp. 1-2, English lang. pp. 1-3.

Text of the First Office Action 2005100562029, SPI051210-6, Chinese lang. pp. 1-4, English lang. pp. 1-7.

* cited by examiner

AN EXAMPLE OF ACCESS CONTENTION BETWEEN READING AND WRITING

ANOTHER EXAMPLE OF ACCESS CONTENTION BETWEEN READING AND WRITING

FIRST CYCLE

★ MEMORY ACCESS DUE TO HARQ SYNTHESIS
▼ MEMORY ACCESS DUE TO RATE DEMATCHING

SECOND CYCLE

FIFTH CYCLE

SIXTH CYCLE

FIFTH CYCLE

SIXTH CYCLE

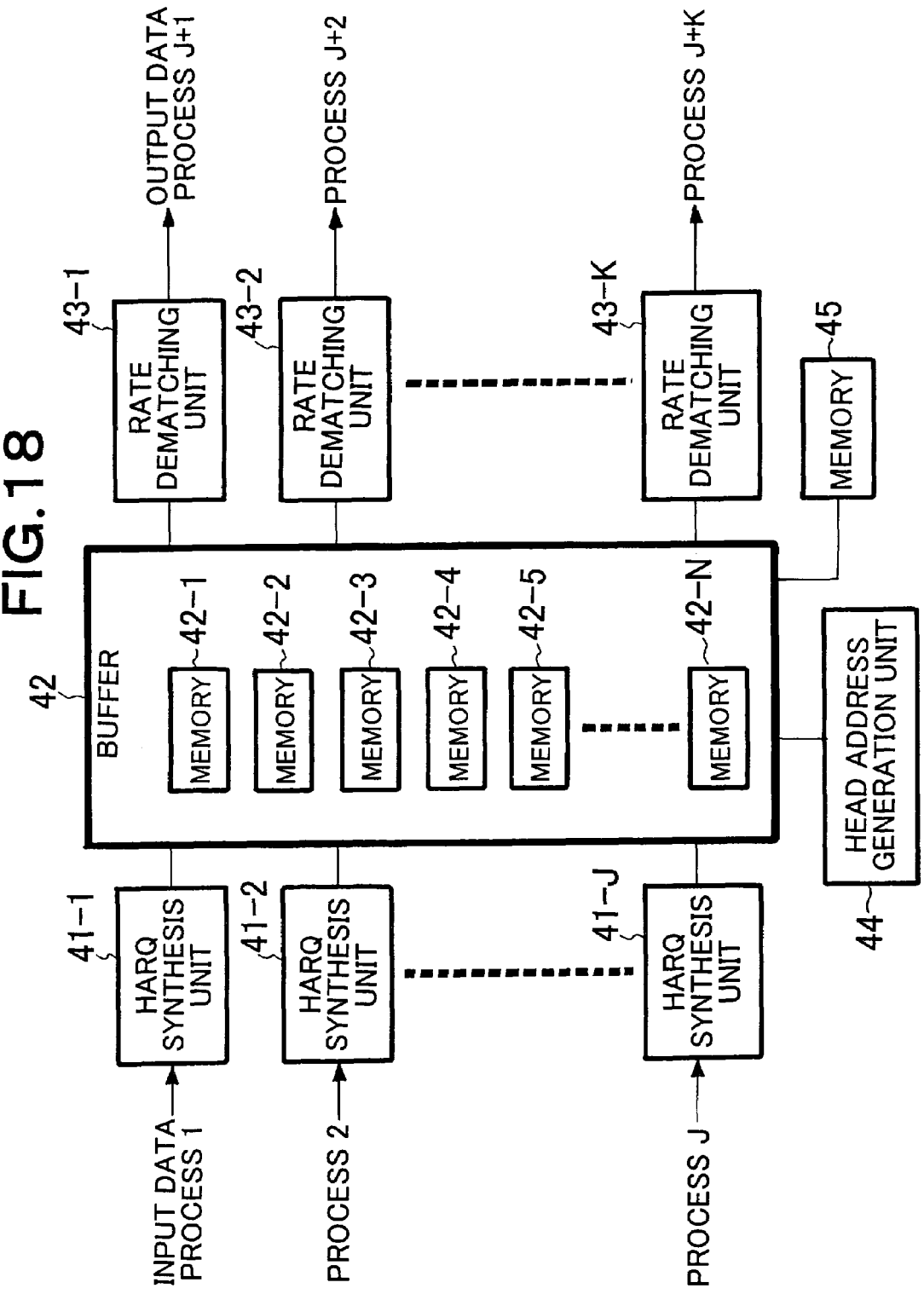

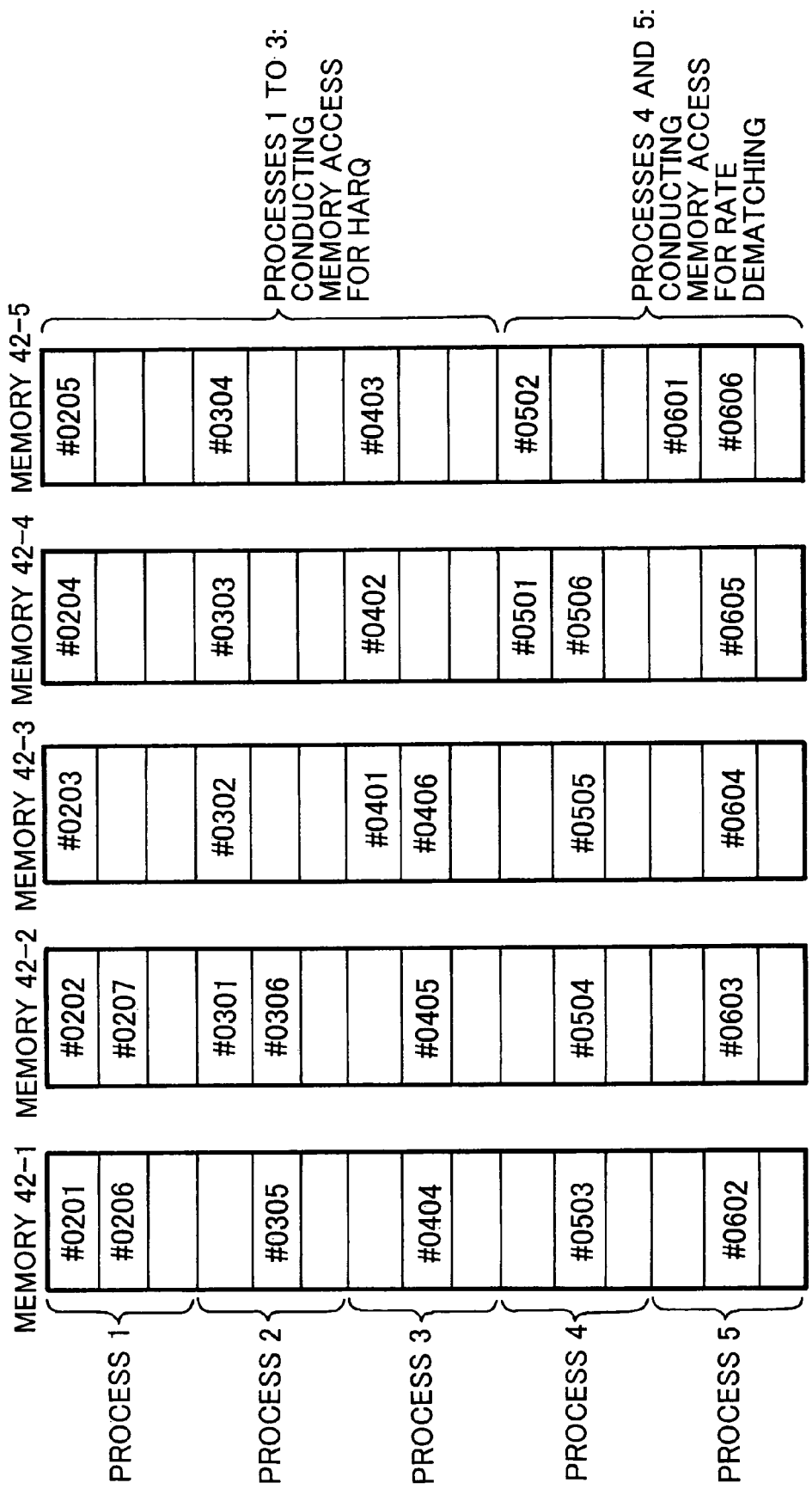

DATA PROCESSING APPARATUS, AND ITS PROCESSING METHOD, PROGRAM PRODUCT AND MOBILE TELEPHONE APPARATUS

BACKGROUND OF THE INVENTION

The present invention relates to a data processing apparatus, its processing method, program product and mobile telephone apparatus. In particular, the present invention relates to a receiving side data processing apparatus in a HARQ (Hybrid Automatic Repeat Request) processing apparatus used in W-CDMA (Wideband-Code Division Multiple Access), its processing method, program product and mobile telephone apparatus.

The international standard association 3GPP (3rd Generation Partnership Project) for the third generation mobile radio communication system attempts to add a new function called HSDPA (High Speed Downlink Packet Access) to the W-CDMA standards in order to implement faster radio communication. One kind of characteristic processing that makes fast communication according to the HSDPA possible is HARQ (see 3GPP TS25.212 V5.6.0 (2003.9) 4.2.7, 4.5.4).

The HARQ is processing for conducting data retransmission efficiently when data cannot be received correctly at the receiving side. In the HARQ processing at the transmitting side, transmission data is divided into a plurality of groups. In the 3GPP, the groups are called processes. And retransmission in the HARQ is managed every process. As a result, it becomes possible to transmit and receive data of other processes while data retransmission of a certain process is being conducted.

FIG. 1 is a configuration diagram showing an example of a conventional transmitting side HARQ processing apparatus. FIG. 2 is a configuration diagram showing an example of a conventional receiving side HARQ processing apparatus.

With reference to FIG. 1, the conventional transmitting side HARQ processing apparatus 100 includes J (where J is a positive integer) rate matching units 101. Data 102 including N (where N is a positive integer and N>J) processes is supplied to the conventional transmitting side HARQ processing apparatus 100 as its input data. Its output data is interleaved by an interleave unit 103 and then output as output data 104 including N processes. The rate matching unit 101 conducts processing every J processes simultaneously, and consequently outputs N process data.

With reference to FIG. 2, a conventional receiving side HARQ processing apparatus 110 includes J HARQ synthesis units 111, a buffer 112, and K (where K is a positive integer and K<N) rate matching units 113. The output data 104 of the transmitting side HARQ processing apparatus 100 is supplied as an input. The input data 104 is deinterleaved in a deinterleave unit 114, and input to the receiving side HARQ processing apparatus 110.

HARQ processing in the receiving side HARQ processing apparatus 110 includes elementary processing called HARQ synthesis in the HARQ synthesis unit 111 and rate dematching in the rate dematching unit 113.

The HARQ synthesis is processing of adding data of a process that could not be received correctly and the same data that is retransmitted. As a result, the possibility that data can be received correctly at the time of retransmission is increased. The rate dematching is inverse processing to processing of adjusting difference in rate between transmission data and a physical channel, which is called rate matching.

If in the rate matching conducted in the transmitting side HARQ processing apparatus 100 the rate of the transmission data is higher than the rate of the physical channel, the rate of the transmission data is squared with the rate of the physical channel are by thinning (hereafter called "puncture") some data in a transmission data train.

Conversely, if the rate of the transmission data is lower than the rate of the physical channel, the rate of the transmission data is squared with the rate of the physical channel by repeating (hereafter called "repeat") some data in the transmission data train.

On the other hand, in the rate dematching, dummy data are inserted in locations of data thinned on the transmitting side, or data repeated on the transmitting side are deleted.

When implementing such HARQ processing conducted on the receiving side as an apparatus, the buffer 112 becomes necessary to store data transmitted last time until the same data is retransmitted, besides the HARQ synthesis unit 111 and the rate matching unit 113 as shown in FIG. 2. When implementing the buffer 112 by using a single-port memory, schemes described below are generally considerable. However, those schemes have problems.

Furthermore, an example of such techniques is disclosed in Japanese Patent Publication (JP-A) No. 2000-173261 (claim 1, paragraph 0005, and FIG. 1). During a first cycle, an address of each even-numbered value is supplied to a write port and an address of each odd-numbered value is supplied to a read port. During a subsequent second cycle, an address of each odd-numbered value is supplied to a write port and an address of each even-numbered value is supplied to a read port. Such a technique of switching the write port and the read port alternately in each cycle and conducting data writing and reading is disclosed.

Scheme 1: It is a scheme of implementing the buffer 112 by using one physical memory (buffer 112). If, for example, there are four processes (process 1, process 2, process 3 and process 4), data of these processes are disposed on one physical memory (buffer 112). FIG. 3 is a diagram showing the scheme 1. If it is attempted to execute the rate dematching on data of the process 2 and the HARQ synthesis on data of the process 3 simultaneously as shown in FIG. 3, accesses to the buffer 112 occur simultaneously and consequently access contention occurs. Therefore, the rate dematching and the HARQ synthesis cannot be executed simultaneously. The HARQ synthesis is executed after execution of the rate dematching is completed, or the rate dematching is executed after execution of the HARQ synthesis is completed. In this way, this scheme has a problem of lengthened execution time of the HARQ.

Scheme 2: FIG. 4 is a diagram showing a scheme 2. In the scheme 2, a buffer 112 is formed of a plurality of physical memories (RAMs 121 to 124), and physical memories and processes are assigned in one-to-one correspondence as shown in FIG. 4. In the example shown in FIG. 4, data of a process 1 is stored in the RAM 121, and data of a process 2 is stored in the RAM 122. Data of a process 3 is stored in the RAM 123, and data of a process 4 is stored in the RAM 124.

In this case, in the rate dematching conducted on the data of the process 2 and the HARQ synthesis conducted on the data of the process 3, accesses to the buffer 112 become accesses to different physical memories. In other words, the RAM 122 is accessed in the processing of the rate dematching and the RAM 123 is accessed in the processing of the HARQ synthesis. Therefore, simultaneous execution of the rate dematching and the HARQ synthesis becomes possible.

By the way, the data sizes of respective processes and the number of processes change dynamically during communication, according to the HSDPA standards. Therefore, it is necessary to dynamically change memory assignment of respective processes. FIG. 5 is a diagram showing access contention in the scheme 2. As shown in FIG. 5, there is a possibility of disposing data of two processes (the process 2 and the process 3 in an example shown in FIG. 5) on the same physical memory (RAM 122). In this case, access contention occurs and consequently the same problem as that in the scheme 1 occurs.

The above-described schemes of two kinds cannot eliminate the problem that the HARQ synthesis and the rate dematching cannot be executed simultaneously and consequently the execution time of the whole HARQ is long.

On the other hand, while the technique described in JP-A-2000-173261 is intended for access control on one dual port memory (a memory having one input port and one output port), the present invention is intended for two or more single port memories (memories each having one port that serves as both input port and output port), and its control method is entirely different from the technique described in JP-A-2000-173261.

SUMMARY OF THE INVENTION

An object of the present invention is to provide a data processing apparatus, and its processing method, program product and mobile telephone apparatus capable of preventing contention of memory access between the HARQ synthesis and rate dematching in the HARQ processing using two or more single-port memories.

In order to achieve the object, a data processing apparatus according to the present invention is a data processing apparatus which executes a plurality of data processing simultaneously, the data processing apparatus including a plurality of data processing means provided so as to be associated with respective data processing, as many single-port memories as the number of data processing, and control means for controlling the single-port memories, wherein the control means exercise control so as to cause access to the single-port memories conducted by respective data processing means to be conducted with respect to different single-port memories in accordance with a predetermined sequence, and if a change occurs in the sequence of access in processing of any data processing means and access contention occurs between the data processing means involving the change and another data processing means, access of one data processing means is given priority over access of the other data processing means.

A data processing method according to the present invention is a data processing method of executing a plurality of data processing simultaneously, the data processing method including a plurality of data processing steps of conducting respective data processing, and a control step of controlling as many single-port memories as the number of the data processing, wherein at the control step, control is exercised so as to cause access to the single-port memories conducted at respective data processing steps to be conducted with respect to different single-port memories in accordance with a predetermined sequence, and if a change occurs in the sequence of access in processing at any data processing step and access contention occurs between the data processing step involving the change and another data processing step, access at one data processing step is given priority at the control step over access at the other data processing step.

A data processing program product according to the present invention is a data processing program product which causes a computer to execute a plurality of data processing simultaneously, the data processing program product including a plurality of data processing steps of conducting respective data processing, and a control step of controlling as many single-port memories as the number of the data processing, wherein at the control step, control is exercised so as to cause access to the single-port memories conducted at respective data processing steps to be conducted with respect to different single-port memories in accordance with a predetermined sequence, and if a change occurs in the sequence of access in processing at any data processing step and access contention occurs between the data processing step involving the change and another data processing step, access at one data processing step is given priority at the control step over access at the other data processing step.

According to the present invention, the buffer includes a plurality of physical memories, for example, two physical memories. One of the memories is used as a memory for even address, whereas the other of the memories is used as a memory for odd address. As regards access to the buffer due to the HARQ synthesis and rate dematching, the following control is conducted.

(1) Access control is conducted so as to make the rate dematching access the odd address memory when the HARQ synthesis accesses the even address memory.

(2) Access control is conducted so as to make the rate dematching access the even address memory when the HARQ synthesis accesses the odd address memory.

(3) If a situation that the HARQ synthesis and the rate dematching access simultaneously access the even address memory or the odd address memory occurs, access of either HARQ synthesis or rate dematching is delayed by one cycle. Memory access caused by the HARQ synthesis and rate dematching in the next cycle is restored to the state of (1) or (2).

According to the present invention, the control means exercise control so as to cause access to the single-port memories conducted by respective data processing means to be conducted with respect to different single-port memories in accordance with a predetermined sequence, and if a change occurs in the sequence of access in processing of any data processing means and access contention occurs between the data processing means involving the change and another data processing means, access of one data processing means is given priority over access of the other data processing means. As a result, it becomes possible to prevent memory access contention.

Specifically, according to the present invention, memory access contention does not occur between the HARQ synthesis and rate dematching. Therefore, these processing can be executed simultaneously. As a result, the processing time of the HARQ can be shortened. This effect can be obtained even when memory assignment of processes is changed according to a dynamic change in data sizes of processes and the number of processes.

BRIEF DESCRIPTION OF THE DRAWINGS

FIG. 18 is a configuration diagram showing a third embodiment of a data processing apparatus; and FIG. 19 is a schematic diagram showing an address assignment example of processes to memories.

DESCRIPTION OF THE PREFERRED EMBODIMENTS

Hereafter, embodiments of the present invention will be described with reference to accompanying drawings.

First Embodiment

Figure 1:
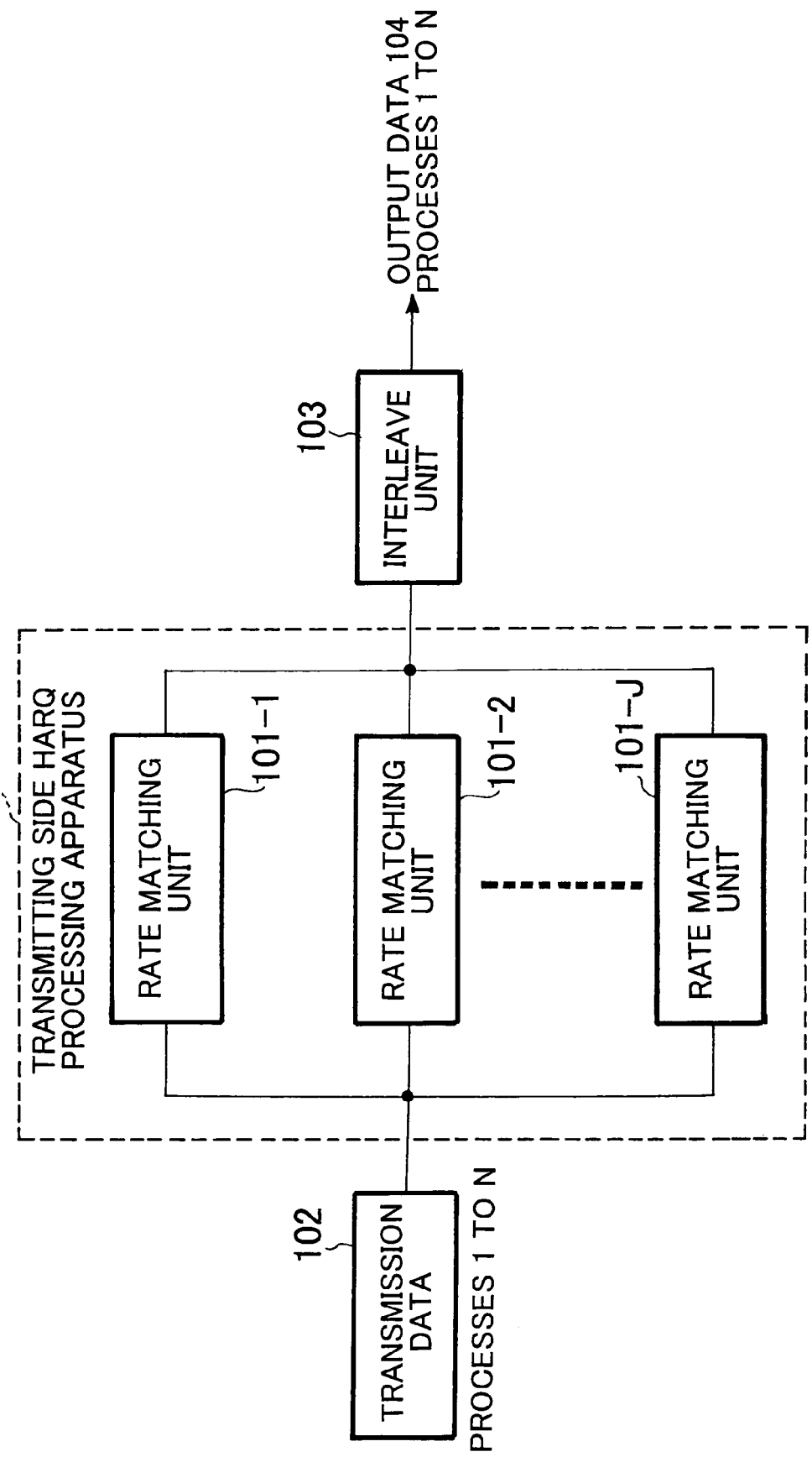
FIG. 1 is a configuration diagram showing an example of a conventional transmitting side HARQ processing apparatus.
Figure 2:
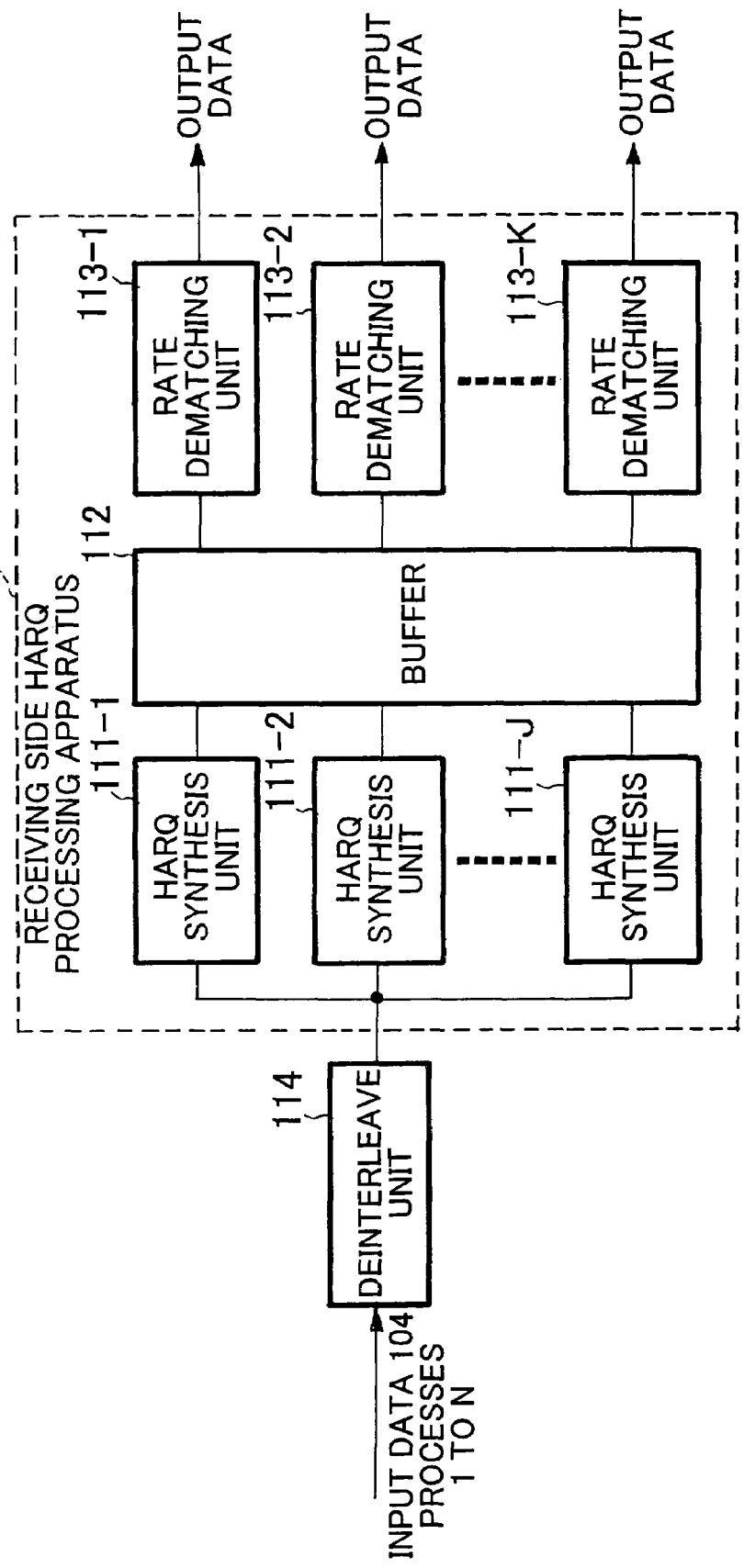
FIG. 2 is a configuration diagram showing an example of a conventional receiving side HARQ processing apparatus.
Figure 3:
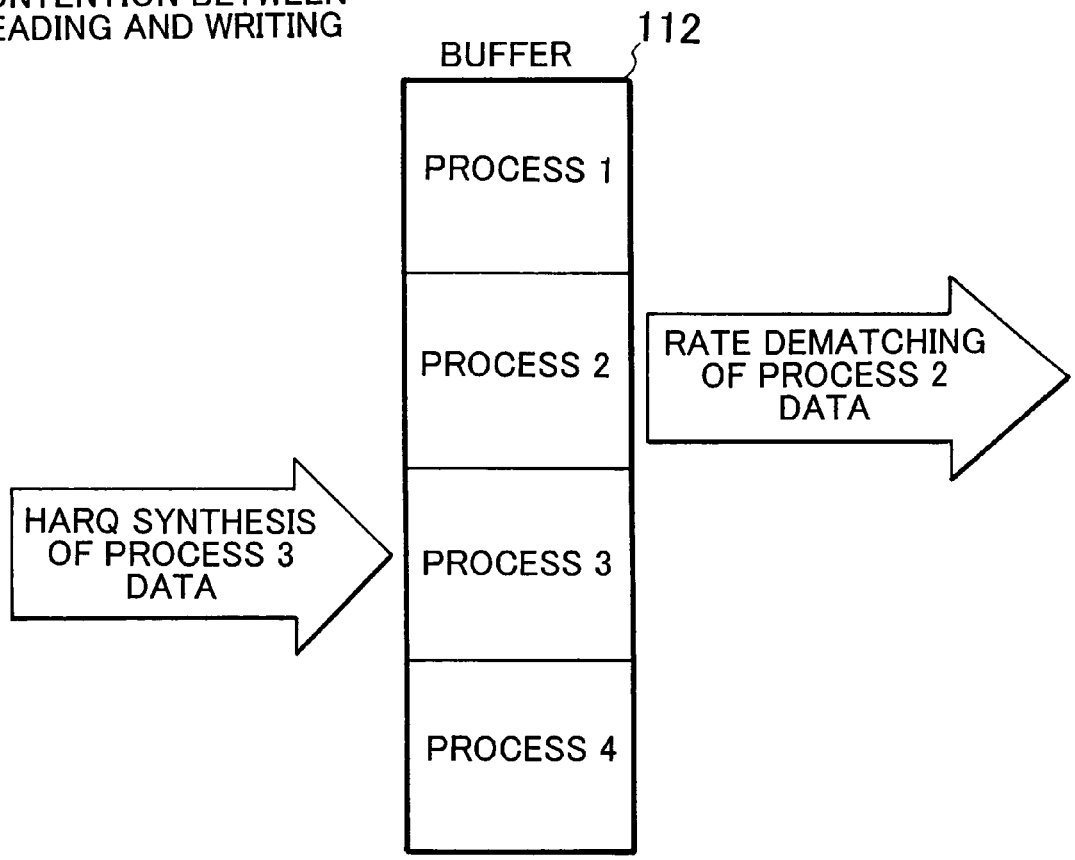
FIG. 3 is a diagram showing a scheme 1.
Figure 4:
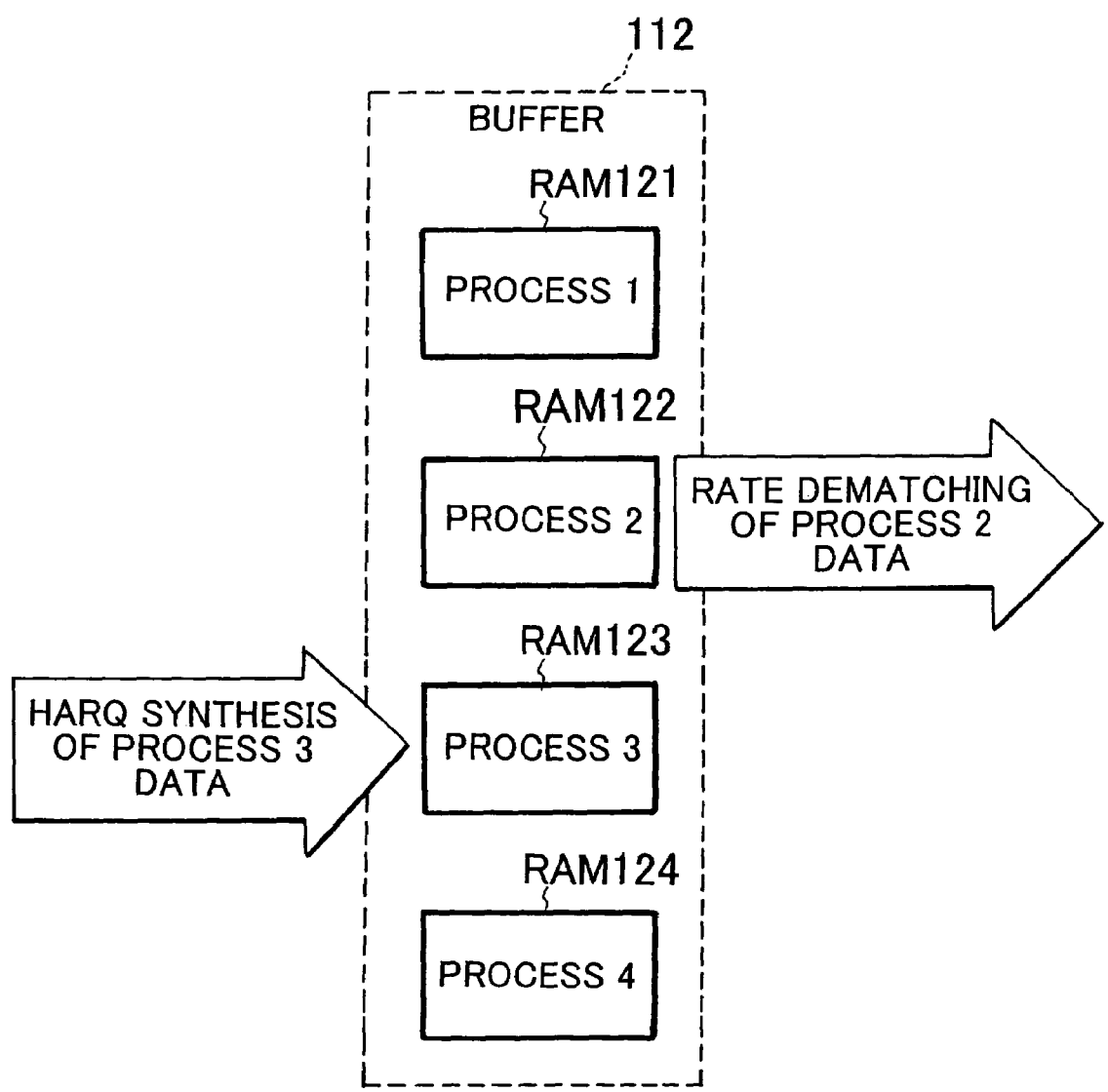
FIG. 4 is a diagram showing a scheme 2.
Figure 5:
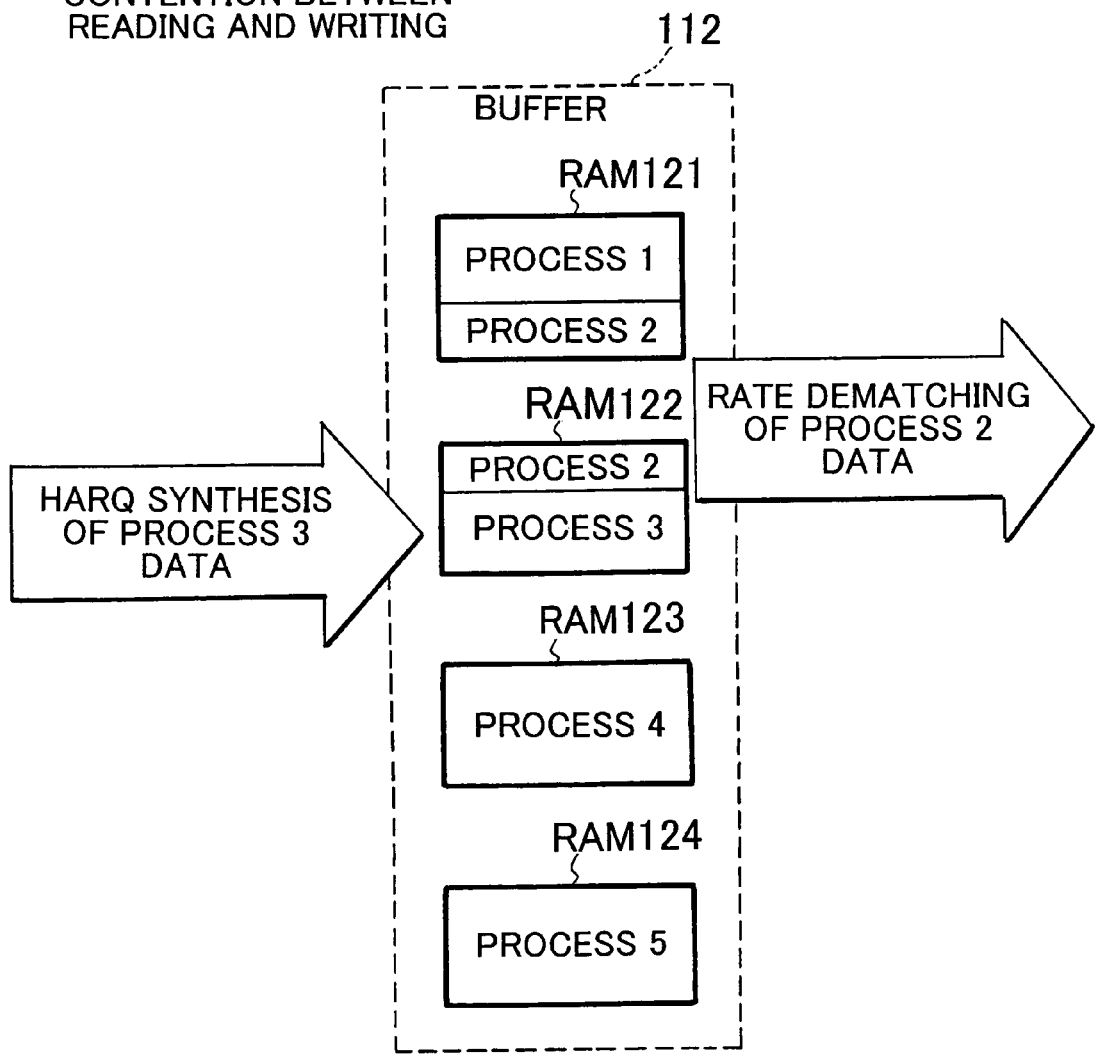
FIG. 5 is a diagram showing access contention in a scheme 2.
Figure 6:
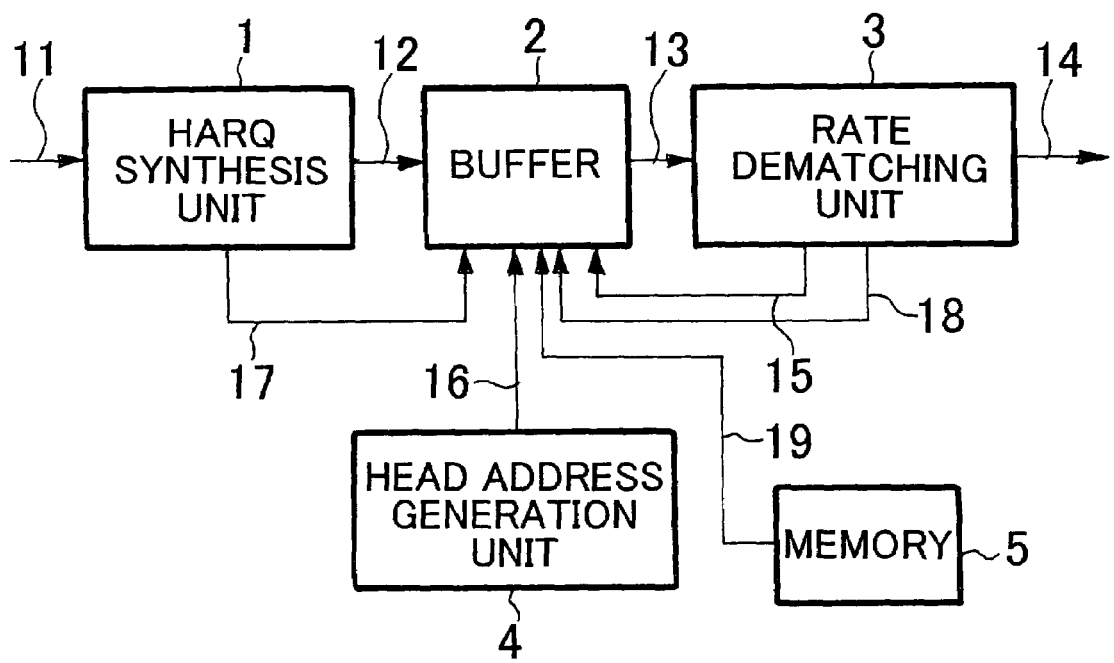
FIG. 6 is a configuration diagram showing a first embodiment of a data processing apparatus according to the present invention.

FIG. 6 is a configuration diagram showing a first embodiment of a data processing apparatus. With reference to FIG. 6, the data processing apparatus includes a HARQ synthesis unit 1, a buffer 2, a rate dematching unit 3, a head address generation unit 4, and a memory 5.

The HARQ synthesis unit 1 is a processing block that conducts HARQ synthesis. Output data 11 of deinterleave processing which is a previous process of the HARQ processing is supplied to the HARQ synthesis unit 1 as its input. The HARQ synthesis unit 1 outputs data 12 obtained after the HARQ synthesis.

The buffer 2 is a memory that retains the output data 12 of the HARQ synthesis unit 1 and supplies input data 13 of the rate dematching unit 3. The output date 12 of HARQ synthesis unit 1 is supplied to buffer 2 as its input. The buffer 2 outputs the input data 13 to the rate dematching unit 3.

The rate dematching unit 3 is a processing block that conducts the rate dematching. The rate dematching unit 3 is supplied with the output data 13 of the buffer 2 as its input, and outputs data 14 obtained after the rate dematching. When conducting processing on data in a location where puncturing or repeating was conducted on the transmitting side, the rate dematching unit 3 turns on a puncture/repeat indication signal 15. When conducting processing on other data, the rate dematching unit 3 turns off the puncture/repeat indication signal 15.

The head address generation unit 4 sets a storage address of head data of each process in the buffer 2 by using a head address signal 16.

By the way, an operation status signal 17 which indicates that the HARQ synthesis unit 1 is in operation is output from the HARQ synthesis unit 1 to the buffer 2. An operation status signal 18 which indicates that the rate dematching unit 3 is in operation is output from the rate dematching unit 3 to the buffer 2. A data readout signal 19 is output from the memory 5 to the buffer 2.

A program for a data processing method is stored in the memory 5.

Figure 7:
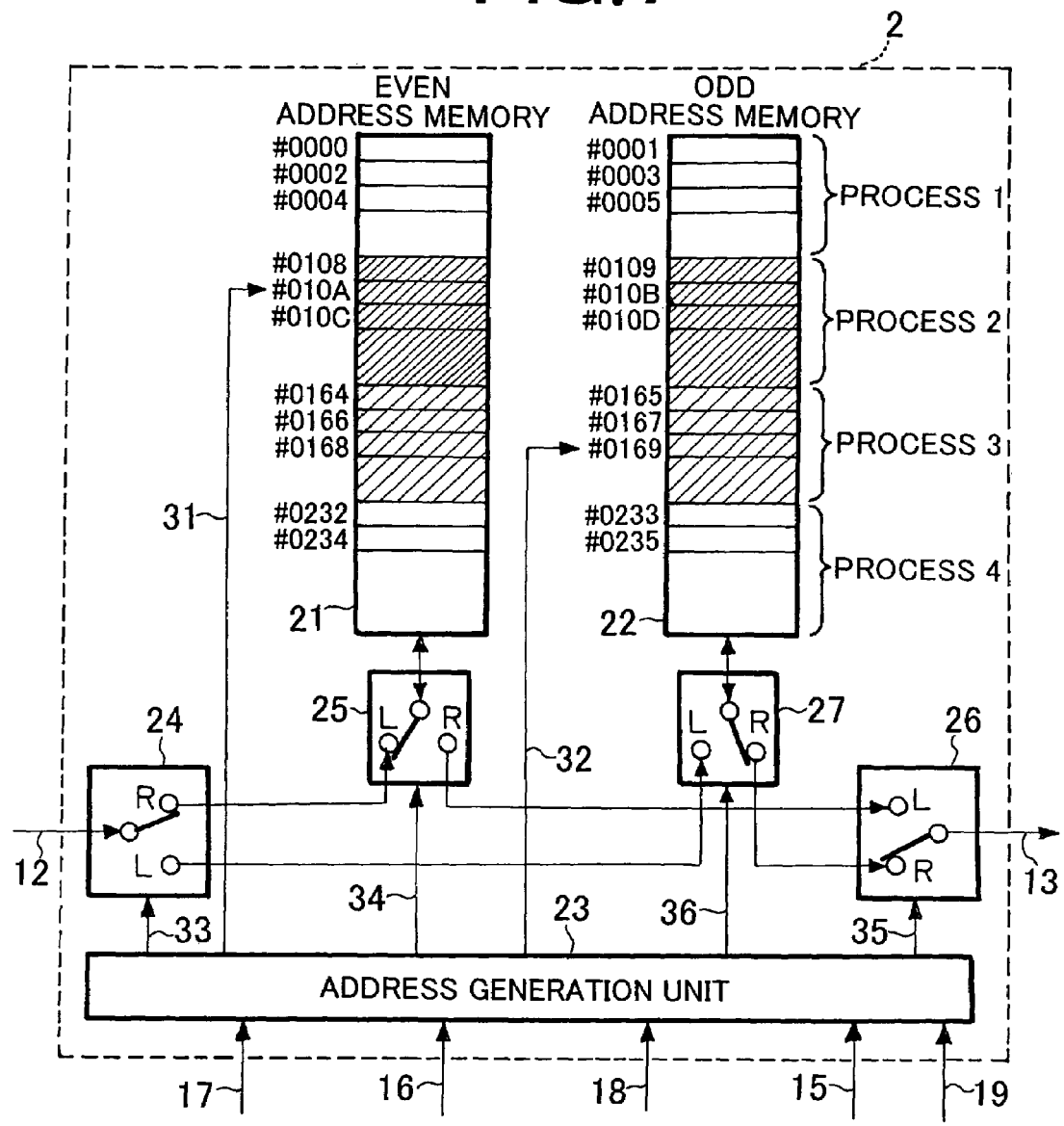
FIG. 7 is a configuration diagram showing an example of a buffer 2 according to the present invention.

FIG. 7 is a configuration diagram showing an example of the buffer 2. With reference to FIG. 7, the buffer 2 includes an even address memory 21, an odd address memory 22, an address generation unit 23, and switches 24 to 27.

By the way, the puncture/repeat indication signal 15, the head address signal 16, the operation status signals 17 and 18, and the data readout signal 19 are input to the address generation unit 23.

As an example, data of four processes (processes 1 to 4) are written into each of the memories 21 and 22 in the buffer 2 of the present embodiment.

The even address memory 21 is a memory that retains even-numbered data in each process. The even address memory 21 is supplied with the data 12 obtained after the synthesis conducted by the HARQ synthesis unit 1, as its input. The even address memory 21 outputs the input data 13 of the rate dematching unit 3.

The odd address memory 22 is a memory that retains odd-numbered data in each process. The odd address memory 22 is supplied with the data 12 obtained after the synthesis conducted by the HARQ synthesis unit 1, as its input. The odd address memory 22 outputs the input data 13 of the rate dematching unit 3.

The address generation unit 23 is a processing block that generates an address 31 of the even address memory 21, an address 32 of the odd address memory 22, and selection signals 33 to 36 for the switches 24 to 27. The processing in the address generation unit 23 is executed in accordance with a program read out from the memory 5 by the address generation unit.

If two accesses contend in either the even address memory 21 or the odd address memory 22, the address generation unit 23 exercises control so as to delay one of the accesses by one cycle. If the operation status signals 17 and 18 that indicate that the HARQ synthesis unit 1 and the rate dematching unit 3 are in operation are turned on, the address generation unit 23 starts generation of the addresses 31 and 32. Furthermore, the puncture/repeat indication signal 15 which indicates data punctured or repeated on the transmitting side is input from the rate dematching unit 3.

The switch 24 is a switch that distributes the output data 12 of the HARQ synthesis unit 1 to either the even address memory 21 or the odd address memory 22 on the basis of the selection signal 33. In the example shown in FIG. 7, "R" indicates connection to the even address memory 21, and "L" indicates connection to the odd address memory 22.

The switch 25 is a switch that connects the even address memory 21 to either the switch 24 or the switch 26 on the basis of the selection signal 34. In the example shown in FIG. 7, "R" indicates connection to the switch 26, and "L" indicates connection to the switch 24.

The switch 26 is a switch that outputs output data of either the even address memory 21 or the odd address memory 22 as the buffer output 13 on the basis of the selection signal 35. In the example shown in FIG. 7, "R" indicates connection to the odd address memory 22, and "L" indicates connection to the even address memory 21.

The switch 27 is a switch that connects the odd address memory 22 to either the switch 24 or the switch 26 on the basis of the selection signal 36. In the example shown in FIG. 7, "R" indicates connection to the switch 26, and "L" indicates connection to the switch 24.

Operation of the first embodiment according to the present invention will now be described. FIGS. 8 to 13 are schematic diagrams showing operation (first to sixth cycles) of the first embodiment. Here, the case where the HARQ synthesis is executed on the data of the process 3 at the same time that the rate dematching is executed on the data of the process 2 will be described as an example. By the way, address values in the ensuing description are nothing but examples.

First, initialization will now be described. Storage address of head data of each process generated by the head address generation unit 4 is set in the address generation unit 23 in the buffer 2 on the basis of the head address signal 16 (in the ensuing example, the head data storage address of the process 2 is #0108 and the head data storage address of the process 3 is #0164). The set value is used as the initial value of the address. Thereafter, the HARQ synthesis unit 1 and the rate dematching unit 3 turn on the operation status signals 17 and 18 at the same time that processing is started. These operation status signals 17 and 18 are always kept in the on-state over the processing interval.

Figure 8:
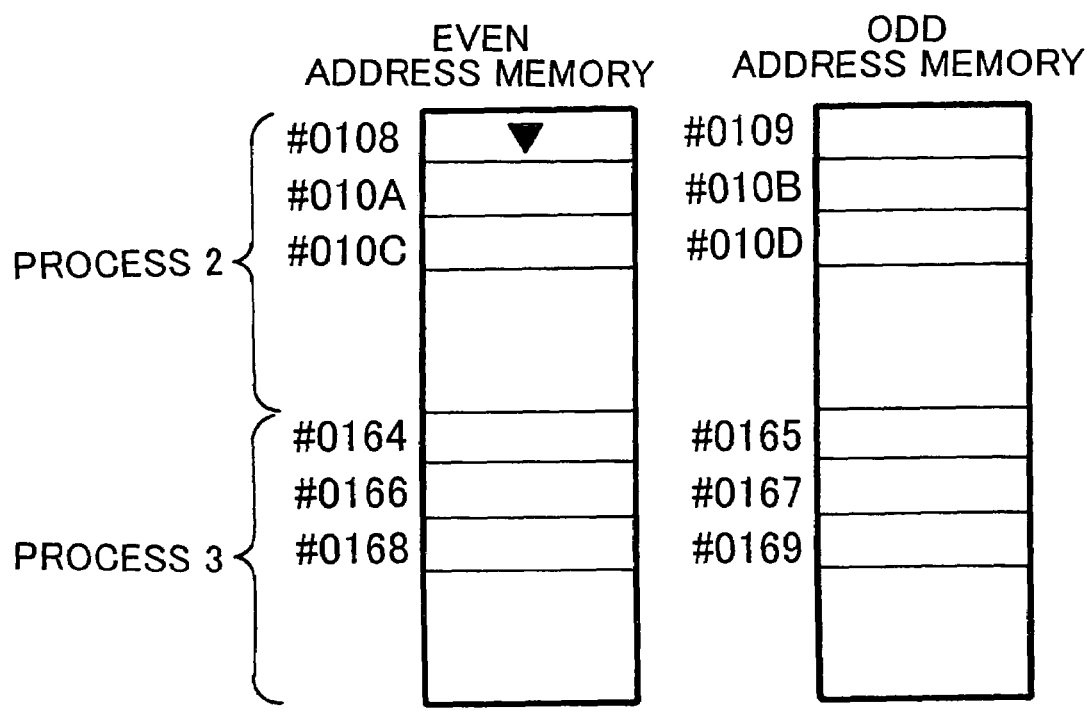
FIG. 8 is a schematic diagram showing operation (first cycle) of the first embodiment.

The first cycle will now be described with reference to FIG. 8. Data of the process 2 is read out from the address 31 (address value #0108) in the even address memory 21, and output as the output data 13 of the buffer 2. The rate dematching unit 3 conducts rate dematching on the data 13. At this time, the address generation unit 23 generates the selection signals 34 and 35 so as to connect the switches 25 and 26 respectively to R and L.

Figure 9:
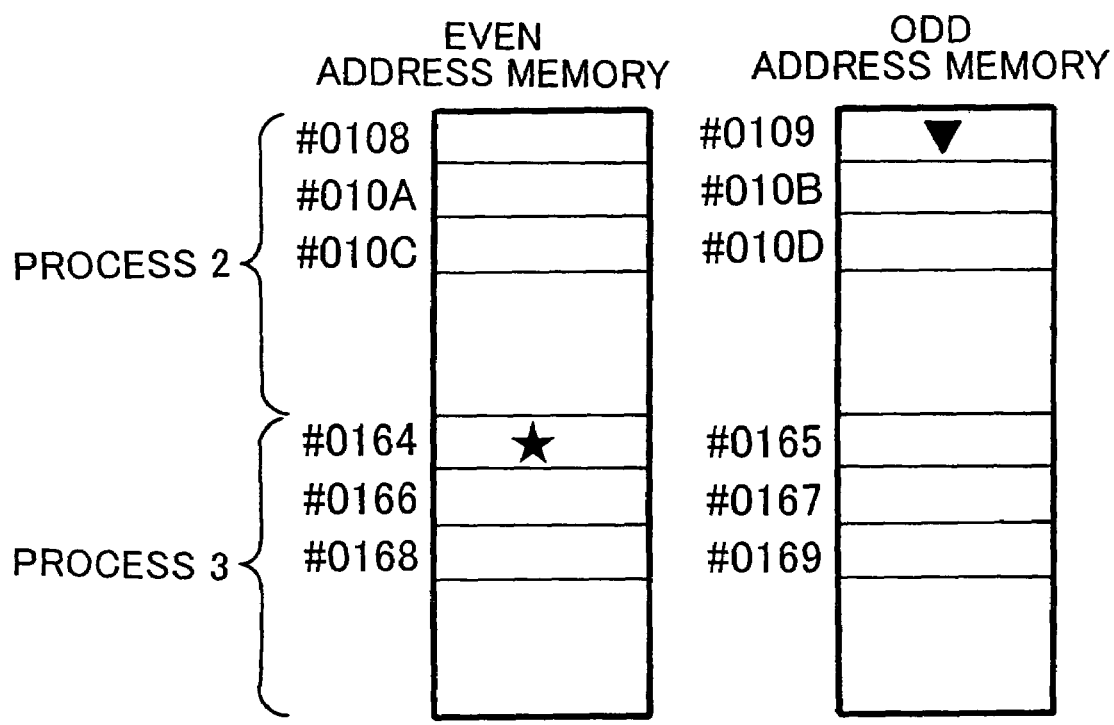
FIG. 9 is a schematic diagram showing operation (second cycle) of the first embodiment.

The second cycle will now be described with reference to FIG. 9. Data of the process 2 is read out from the address 32 (address value #0109) of the odd address memory 22, and output as the output data 13 of the buffer 2. And the rate dematching unit 3 conducts rate dematching on the data 13.

At the same time, the HARQ synthesis is executed in the HARQ synthesis unit 1, and the HARQ synthesis output data 12 is written into the address 31 (address value #0164) in the even address memory 21 as data of the process 3. At this time, the address generation unit 23 generates the selection signals 33 to 36 so as to connect the switches 24 to 27 respectively to R, L, R and R.

Figure 10:
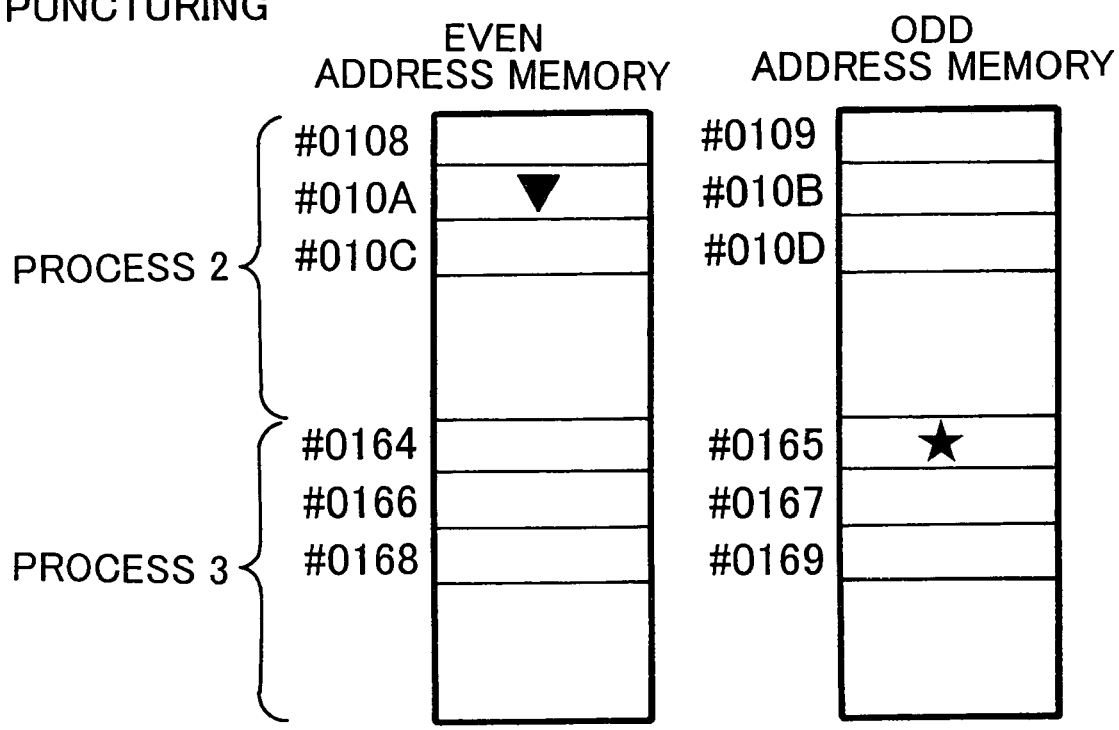
FIG. 10 is a schematic diagram showing operation (third cycle) of the first embodiment.

The third cycle will now be described with reference to FIG. 10. Data of the process 2 is read out from the address 31 (address value #010A) in the even address memory 21, and output as the output data 13 of the buffer 2. The rate dematching unit 3 conducts rate dematching on the data 13.

At the same time, the HARQ synthesis is executed in the HARQ synthesis unit 1, and the HARQ synthesis output data 12 is written into the address 32 (address value #0165) in the odd address memory 22 as data of the process 3. At this time, the address generation unit 23 generates the selection signals 33 to 36 so as to connect the switches 24 to 27 respectively to L, R, L and L.

In the present embodiment, the data of the process 2 is punctured on the transmitting side, and the rate dematching unit 3 inserts dummy data. Therefore, data of the process 2 in the address #010A is read out again at the next fourth cycle. Whether data has been punctured is indicated by the indication signal 15.

Figure 11:
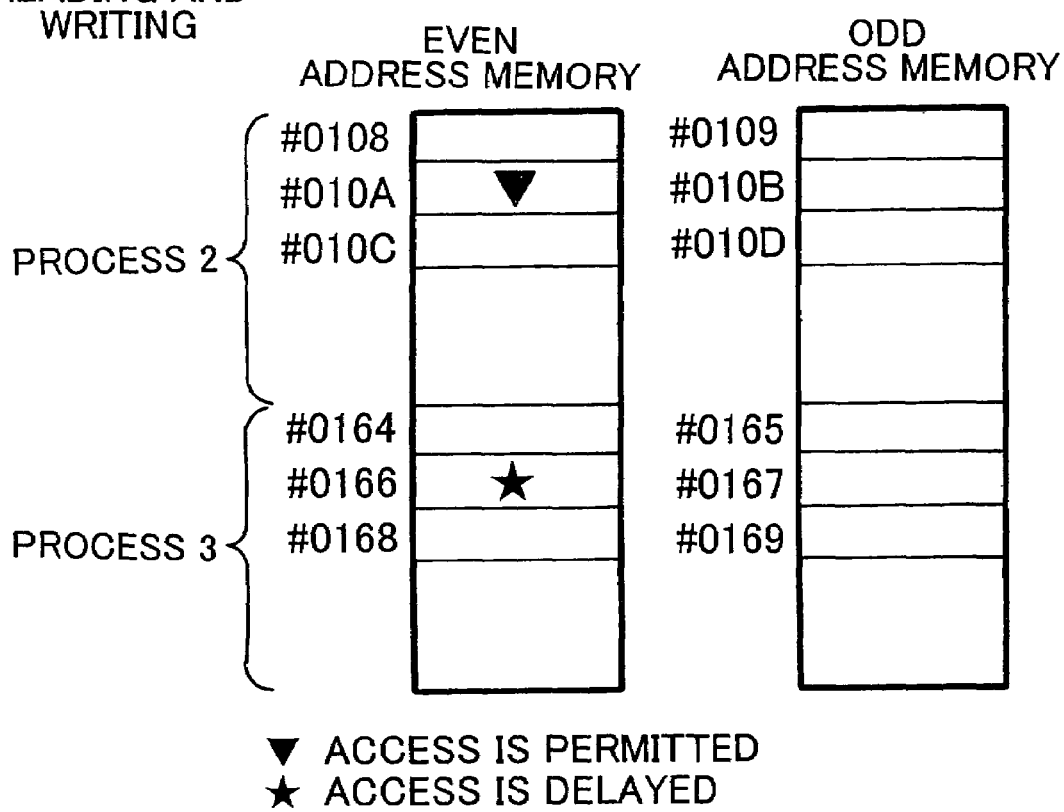
FIG. 11 is a schematic diagram showing operation (fourth cycle) of the first embodiment.

The fourth cycle will now be described with reference to FIG. 11. At the same time that data of the process 2 is read out from the address value #010A in the even address memory 21, it is attempted to write the HARQ synthesis output data 12 into an address value #0166 in the even address memory 21 as data of the process 3. As a result, access contention to the even address memory 21 occurs.

In the present example, reading data of the process 2 (i.e., memory access to the address value #010A) is permitted, and writing data of the process 3 (i.e., memory access to the address value #0166) is delayed by one cycle.

At this time, the address generation unit 23 sets the address value #010A in the address 31, and generates the selection signals 34 and 35 so as to connect the switches 25 and 26 respectively to R and L.

Figure 12:
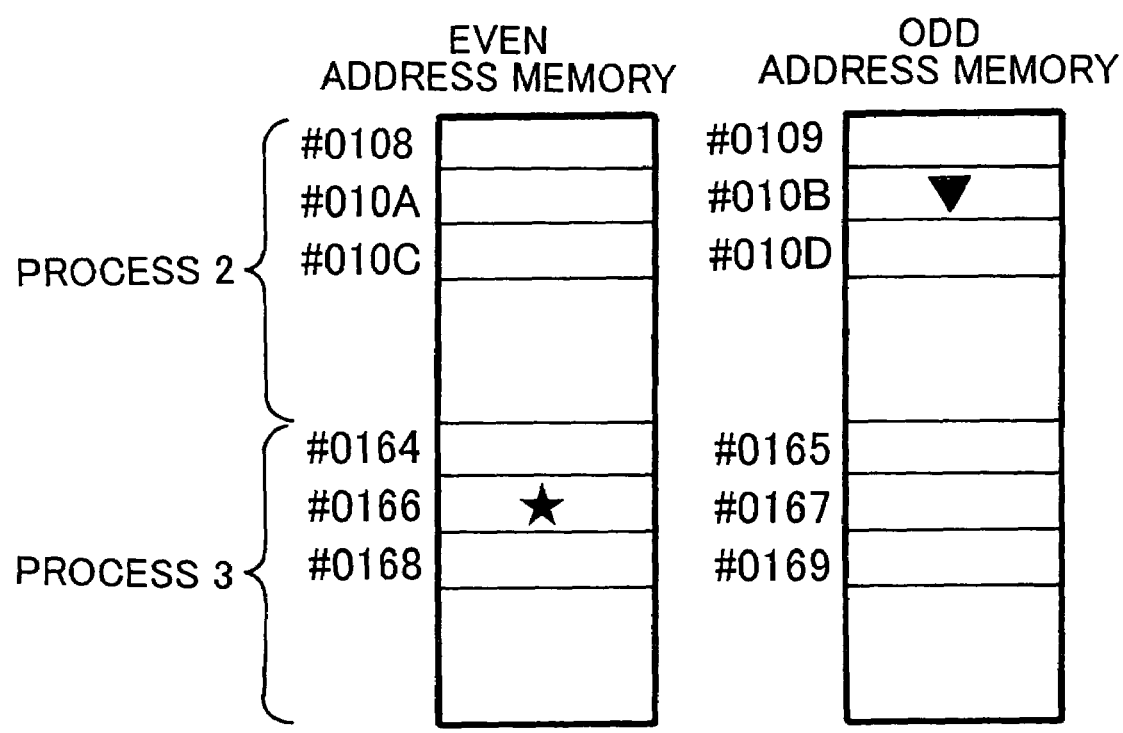
FIG. 12 is a schematic diagram showing operation (fifth cycle) of the first embodiment.

The fifth cycle will now be described with reference to FIG. 12. Data of the process 2 is read out from the address 32 (address value #010B) in the odd address memory 22, and output as the output data 13 of the buffer 2. And the rate dematching unit 3 conducts the rate dematching on the data 13.

At the same time, the HARQ synthesis unit 1 executes the HARQ synthesis, and writes the HARQ synthesis output data 12 into the address 31 (the address value #0166) in the even address memory 21 as the data of the process 3.

At this time, the address generation unit 23 generates the selection signals 33 to 36 so as to connect the switches 24 to 27 respectively to R, L, R and R.

Figure 13:
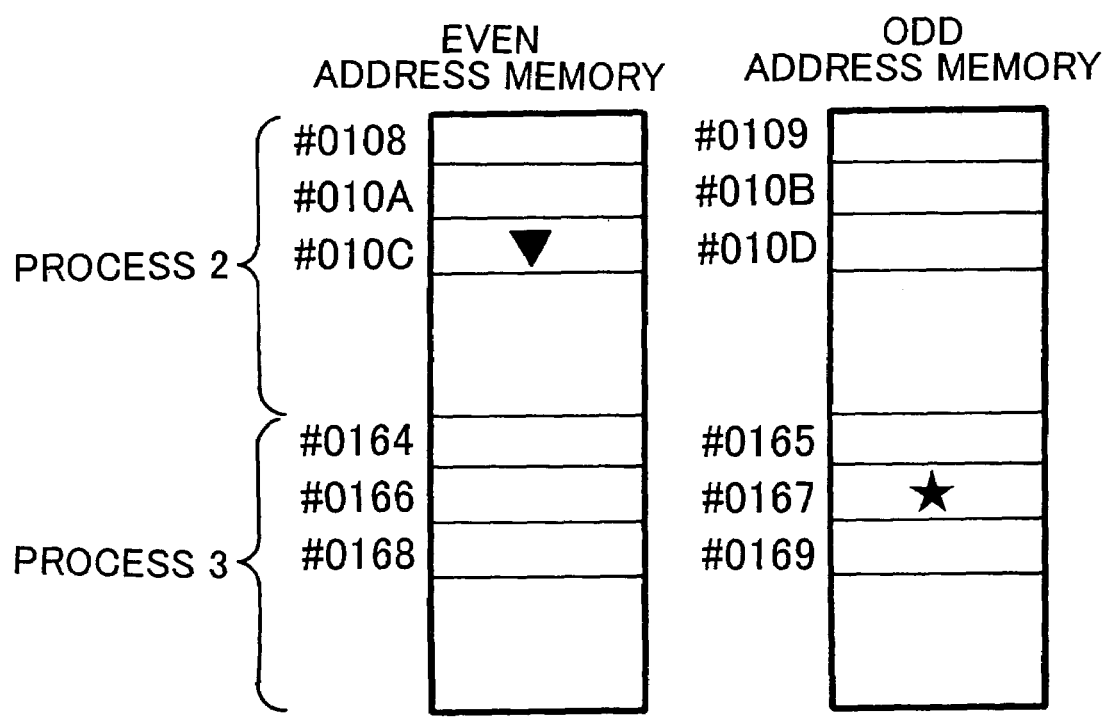
FIG. 13 is a schematic diagram showing operation (sixth cycle) of the first embodiment.

The sixth cycle will now be described with reference to FIG. 13. Data of the process 2 is read out from the address 31 (address value #010C) in the even address memory 21, and output as the output data 13 of the buffer 2. And the rate dematching unit 3 conducts the rate dematching on the data 13.

At the same time, the HARQ synthesis unit 1 executes the HARQ synthesis, and writes the HARQ synthesis output data 12 into the address 32 (the address value #0167) in the odd address memory 22 as the data of the process 3.

At this time, the address generation unit 23 generates the selection signals 33 to 36 so as to connect the switches 24 to 27 respectively to L, R, L and L.

Hereafter, the seventh cycle and subsequent cycles also operate in the same way. Thereafter, the HARQ synthesis unit 1 and the rate dematching unit 3 turn off the operation status signals 17 and 18 when the processing is finished. As a result, the apparatus of the first embodiment stops the operation.

In the above-described embodiment, only the rate dematching is executed in the first cycle and the HARQ synthesis is also executed in the second cycle and subsequent cycles. The reverse is also possible. In other words, only the HARQ synthesis is executed in the first cycle, and the rate dematching is also executed in the second cycle and subsequent cycles. In the case where contention in accesses to the same memory has occurred as in the fourth cycle, memory access caused by rate dematching is permitted preferentially in the above-described embodiment. However, the reverse is also possible. In other words, in the case where access contention to the same memory has occurred, it is also possible to preferentially permit the memory access caused by the HARQ synthesis.

According to the first embodiment, it is possible to prevent contention between the rate dematching unit 3 and the HARQ synthesis unit 1 caused when the rate dematching unit 3 inserts dummy data, as heretofore described. As a result, it becomes possible to execute these processing simultaneously.

Second Embodiment

A second embodiment is similar in configuration to the first embodiment (see FIGS. 6 and 7), but different in operation. In the present embodiment, the data of the process 2 is repeated on the transmitting side, and the rate dematching unit 3 deletes the repeated data. In the wake of the address #010A, therefore, data of the process 2 in the address #010C is read out again in the next fourth cycle (i.e., reading data in the address #010B is not conducted). By the way, whether repeating is conducted is specified by the indication signal 15.

Operation of the initialization, and the first and second cycles are similar to those of the first embodiment. Therefore, its description will be omitted, and a third cycle and subsequent cycles will now be described.

FIGS. 14 to 17 are schematic diagrams showing operation (third to sixth cycles) of the second embodiment.

Figure 14:
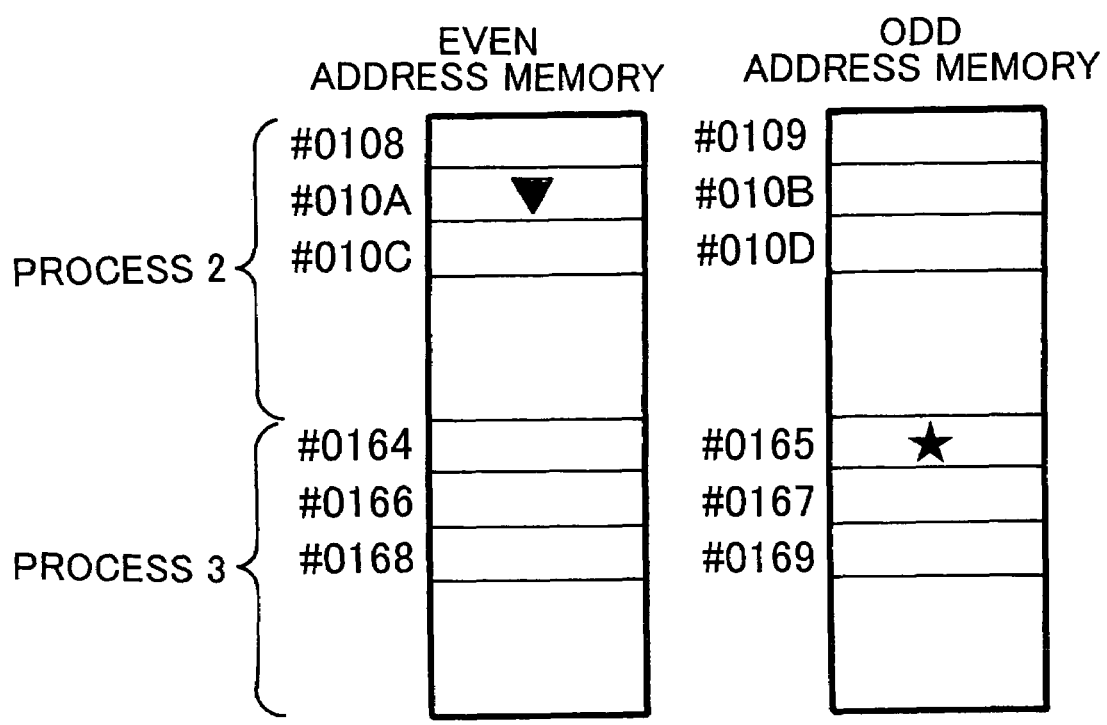
FIG. 14 is a schematic diagram showing operation (third cycle) of the first embodiment.

First, the third cycle will now be described with reference to FIG. 14. Data of the process 2 is read out from the address 31 (address value #010A) in the even address memory 21, and output as the output data 13 of the buffer 2. The rate dematching unit 3 conducts rate dematching on the data 13.

At the same time, the HARQ synthesis is executed in the HARQ synthesis unit 1, and the HARQ synthesis output data 12 is written into the address 32 (address value #0165) in the odd address memory 22 as data of the process 3. At this time, the address generation unit 23 generates the selection signals 33 to 36 so as to connect the switches 24 to 27 respectively to L, R, L and L.

In the present embodiment, data of the process 2 is repeated on the transmitting side, and the rate dematching unit 3 deletes the repeated data. In the wake of readout of data of the process 2 in the address #010A, therefore, data of the process 2 in the address #010C is read out in the next fourth cycle.

Figure 15:
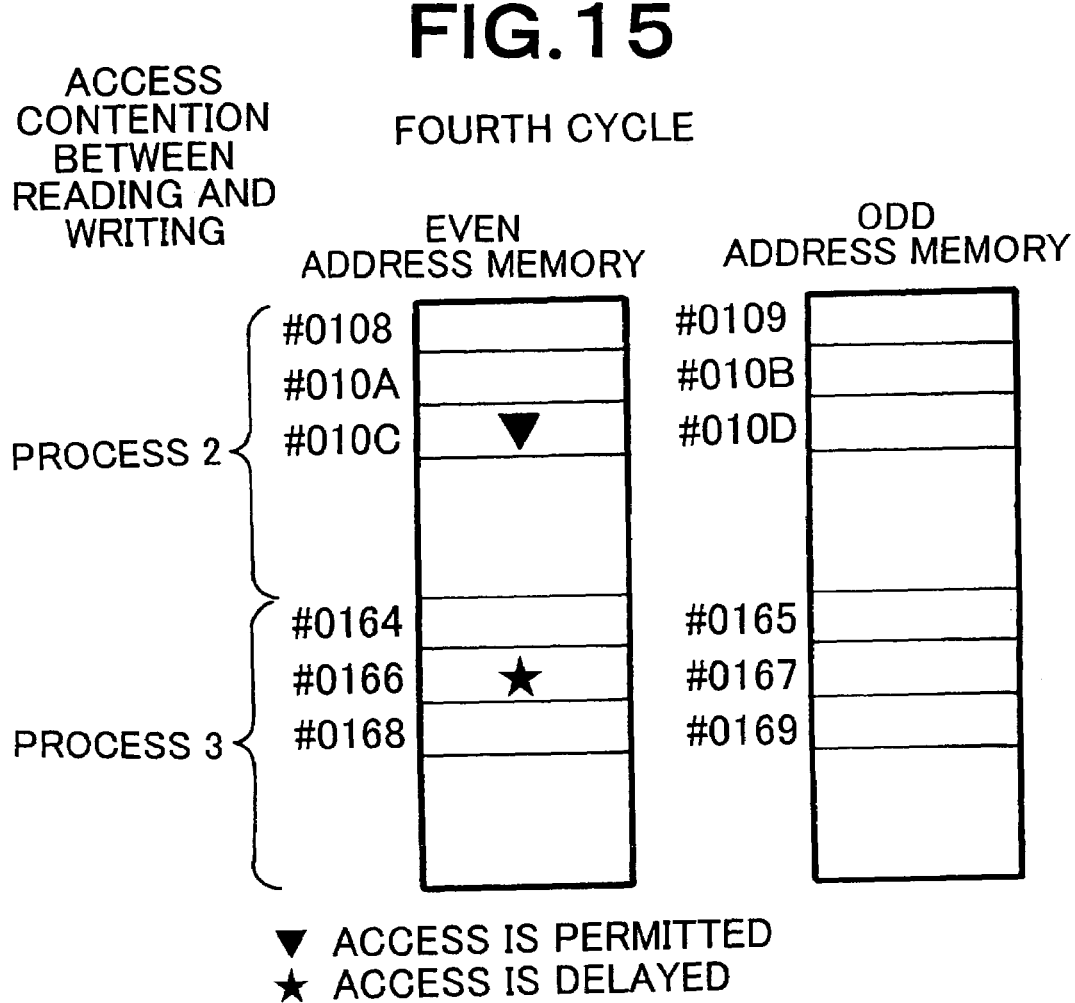
FIG. 15 is a schematic diagram showing operation (fourth cycle) of the first embodiment.

The fourth cycle will now be described with reference to FIG. 15. At the same time that data of the process 2 is read out from the address value #010C in the even address memory 21, it is attempted to write the HARQ synthesis output data 12 into an address value #0166 in the even address memory 21 as data of the process 3. As a result, access contention to the even address memory 21 occurs.

In the present example, reading data of the process 2 (i.e., memory access to the address value #010C) is permitted, and writing data of the process 3 (i.e., memory access to the address value #0166) is delayed by one cycle.

At this time, the address generation unit 23 sets the address value #010C in the address 31, and generates the selection signals 34 and 35 so as to connect the switches 25 and 26 respectively to R and L.

Figure 16:
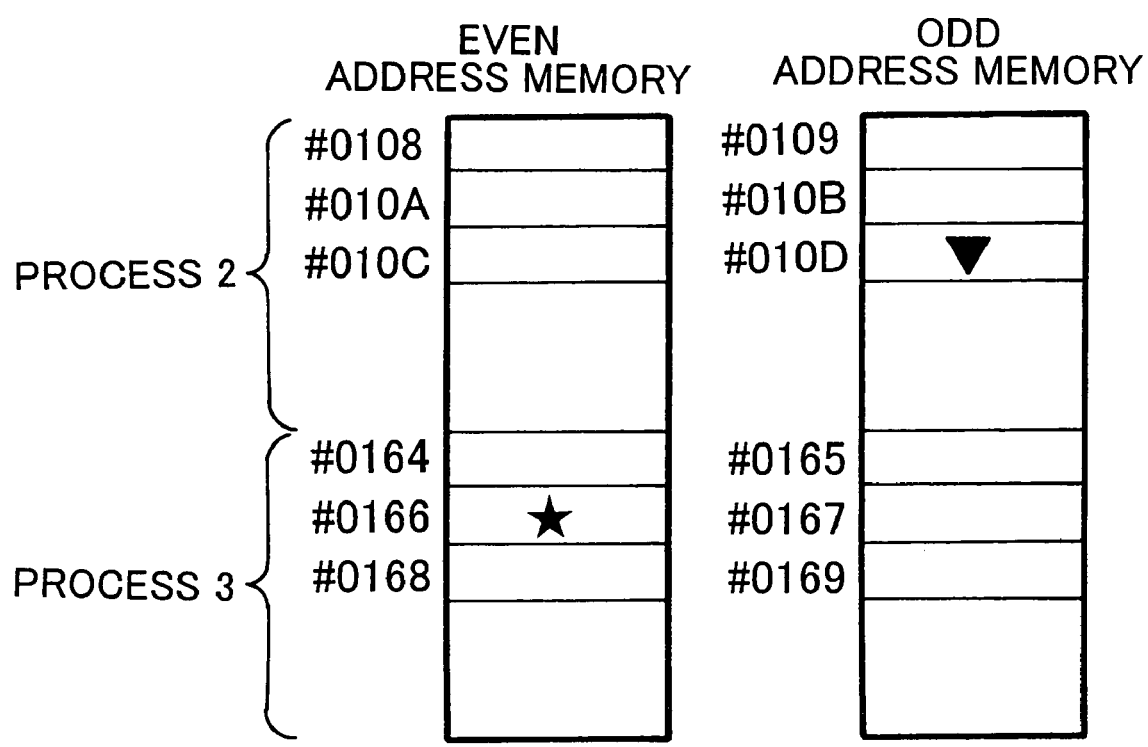
FIG. 16 is a schematic diagram showing operation (fifth cycle) of the first embodiment.

The fifth cycle will now be described with reference to FIG. 16. Data of the process 2 is read out from the address 32 (address value #010D) in the odd address memory 22, and output as the output data 13 of the buffer 2. And the rate dematching unit 3 conducts the rate dematching on the data 13.

At the same time, the HARQ synthesis unit 1 executes the HARQ synthesis, and writes the HARQ synthesis output data 12 into the address 31 (the address value #0166) in the even address memory 21 as the data of the process 3.

At this time, the address generation unit 23 generates the selection signals 33 to 36 so as to connect the switches 24 to 27 respectively to R, L, R and R.

Figure 17:
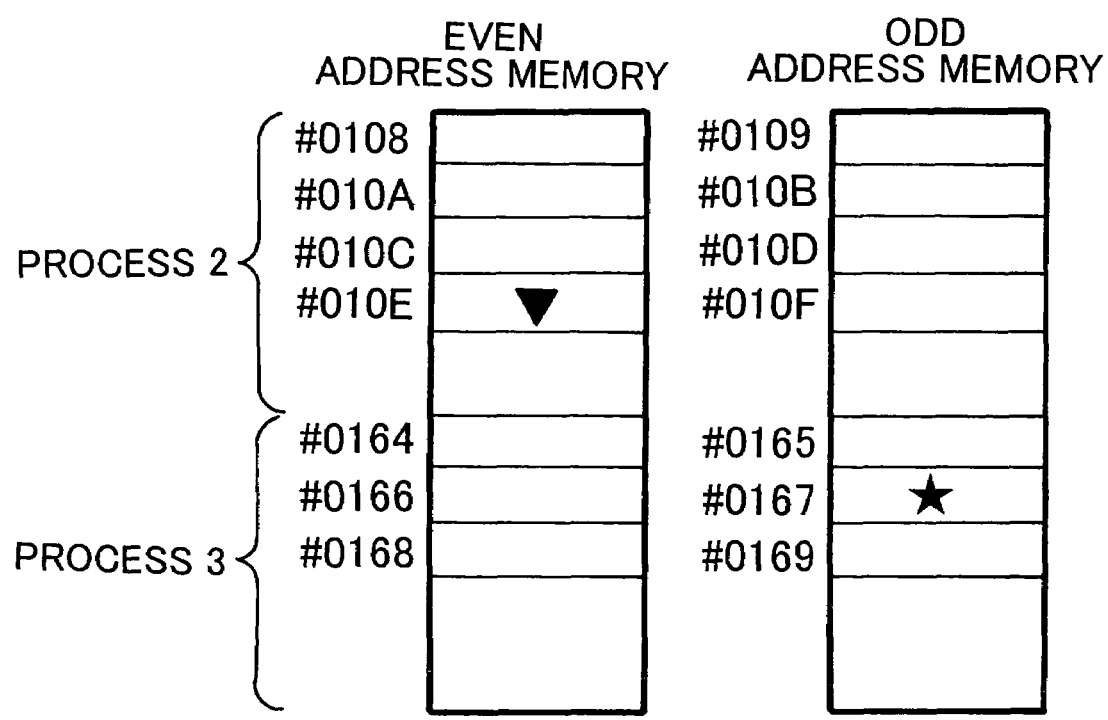
FIG. 17 is a schematic diagram showing operation (sixth cycle) of the first embodiment.

The sixth cycle will now be described with reference to FIG. 17. Data of the process 2 is read out from the address 31 (address value #010E) in the even address memory 21, and output as the output data 13 of the buffer 2. And the rate dematching unit 3 conducts the rate dematching on the data 13.

At the same time, the HARQ synthesis unit 1 executes the HARQ synthesis, and writes the HARQ synthesis output data 12 into the address 32 (the address value #0167) in the odd address memory 22 as the data of the process 3.

At this time, the address generation unit 23 generates the selection signals 33 to 36 so as to connect the switches 24 to 27 respectively to L, R, L and L.

Hereafter, the seventh cycle and subsequent cycles also operate in the same way. Thereafter, the HARQ synthesis unit 1 and the rate dematching unit 3 turn off the operation status signals 17 and 18 when the processing is finished. As a result, the apparatus of the second embodiment stops the operation.

According to the second embodiment, it is possible to prevent contention between the rate dematching unit 3 and the HARQ synthesis unit 1 caused when the rate dematching unit 3 deletes repeated data, as heretofore described. As a result, it becomes possible to execute these processing simultaneously.

Third Embodiment

In a third embodiment, the first and second embodiments which make simultaneous execution of two processes possible are expanded to make simultaneous execution of N processes. By the way, the HARQ synthesis is conducted on J (where J is a positive integer) processes and the rate dematching is conducted on K (where K is a positive integer) processes. At this time, the apparatus in the present embodiment includes J HARQ synthesis units, K rate dematching units, and a buffer including N physical memories. Here, there is a relation N=J+K.

FIG. 18 is a configuration diagram of the third embodiment of the data processing apparatus. With reference to FIG. 18, the data processing apparatus includes HARQ synthesis units 41 (41-1 to 41-J), a buffer 42, rate dematching units 43 (43-1 to 43-K), a head address generation unit 44, and a memory 45. The buffer 42 includes N memories 42 (42-1 to 42-N).

In the present embodiment, N processes are processed simultaneously. In other words, processes 1 to J are processed simultaneously in the HARQ synthesis unit 41. In parallel therewith, processes (J+1) to (J+K) are processed in the rate dematching unit 43.

In the same way as the first and second embodiments, the buffer 42 (specifically, an address generation unit which is not illustrated and which is included in the buffer 42) reads out a program from the memory 45 and conducts data processing.

Data storage areas respectively for processes 1 to (J+K) are provided in each of the memories 42. Each process can access an arbitrary memory 42.

As an example, operation of the present embodiment will now be described as to the case where the HARQ synthesis for the processes 1 to 3 and the rate dematching for the processes 4 and 5 are conducted simultaneously.

FIG. 19 is a schematic diagram showing an address assignment example of processes to memories. With reference to FIG. 19, data of the process 1 is assigned an address #0201 in the memory 42-1 as its start address, then assigned addresses in the memories 42-2 to 42-5, and then assigned an address in the memory 42-1. Thereafter, the assignment is repeated.

Data of the process 2 is assigned an address #0301 in the memory 42-2 as its start address, then assigned addresses in the memories 42-3 to 42-5, and then assigned an address in the memory 42-1. Thereafter, the assignment is repeated.

Data of the process 3 is assigned an address #0401 in the memory 42-3 as its start address, then assigned addresses in the memories 42-4 to 42-5, and then assigned an address in the memory 42-1. Thereafter, the assignment is repeated.

Data of the process 4 is assigned an address #0501 in the memory 42-4 as its start address, then assigned an address in the memory 42-5, and then assigned an address in the memory 42-1. Thereafter, the assignment is repeated.

Data of the process 5 is assigned an address #0601 in the memory 42-5 as its start address, and then assigned an address in the memory 42-1. Thereafter, the assignment is repeated.

In the first cycle, the memory access (#0201) in the memory 42-1 conducted by the process 1, the memory access (#0301) in the memory 42-2 conducted by the process 2, the memory access (#0401) in the memory 42-3 conducted by the process 3, the memory access (#0501) in the memory 42-4 conducted by the process 4, and the memory access (#0601) in the memory 42-5 conducted by the process 5 are processed simultaneously.

Subsequently, in the second cycle, the memory access (#0202) in the memory 42-2 conducted by the process 1, the memory access (#0302) in the memory 42-3 conducted by the process 2, the memory access (#0402) in the memory 42-4 conducted by the process 3, the memory access (#0502) in the memory 42-5 conducted by the process 4, and the memory access (#0602) in the memory 42-1 conducted by the process 5 are processed simultaneously.

In the third cycle and subsequent cycles as well, memory access conducted by each process is successively changed over to an adjacent memory. As a result, access contention does not occur.

However, if, for example, puncturing is caused by the process 4 (rate dematching processing) in the second cycle and consequently processing (dummy data insertion) of repeating, in the third cycle, readout from the address #0502 in the memory 42-5 conducted by the process 4 in the second cycle is conducted, it contends in the third cycle with writing into the address #0403 in the memory 42-5 conducted by the process 3 (HARQ processing).

In this case, therefore, readout of the address #0502 in the memory 42-5 to be conducted by the process 4 is permitted, and writing to be conducted by the process 3 is delayed by one cycle. On the other hand, it is also possible to permit data writing to be conducted by the process 3 and delay data reading to be conducted by the process 4 by one cycle.

As another example, if repeating is caused in the second cycle by the process 4 (rate dematching processing) and consequently in the third cycle readout from the addresses #0503 and #0504 in the memory 42-1 is skipped and readout of the address #505 in the memory 42-3 is conducted, it contends in the third cycle with writing into the address #203 in the memory conducted by the process 1 (HARQ processing).

In this case, therefore, readout of the address #0505 in the memory 42-3 to be conducted by the process 4 is permitted and data writing to be conducted by the process 1 is delayed by one cycle. On the other hand, it is also possible to permit data writing to be conducted by the process 1 and delay data reading to be conducted by the process 4 by one cycle.

According to the third embodiment, it becomes possible to prevent contention between the rate dematching unit 3 and the HARQ synthesis unit 1 even if three or more processes are executed simultaneously, as heretofore described.

Fourth Embodiment

A fourth embodiment relates to a program of a data processing method. With reference to FIGS. 6 and 18, the data processing apparatus includes the memory 5 or 45. As described earlier, the program of the data processing method is stored in the memory 5 or 45.

The program of the data processing method is a program of the memory access method (the first and second embodiments) shown for respective cycles in FIGS. 8 to 17. This program further includes a memory access method for the case where N processes are executed simultaneously described with reference to the third embodiment.

The address generation unit 23 in the buffer 2 and the address generation unit which is included in the buffer 42 and which is not illustrated read the program of the data processing method respectively from the memory 5 and memory 45, and execute the data processing in accordance with the program. Since contents of the data processing have already been described, description thereof will be omitted.

According to the fourth embodiment, it is possible to prevent contention between the rate dematching unit 3 and the HARQ synthesis unit 1 as heretofore described. As a result, it becomes possible to execute a plurality of processes simultaneously.

Application of the present invention to a mobile telephone apparatus that adopts HSDPA which is one prescription of the W-CDMA scheme is expected. Furthermore, application of the present invention to other wireless communication schemes having rate dematching processing such as a wireless LAN (Local Area Network) is also possible.

What is claimed is:

1. A receiving side data processing apparatus of a HARQ processing apparatus which executes a plurality of data processing operations simultaneously, the data processing apparatus comprising:
    a plurality of data processing means comprising a HARQ synthesis unit and a rate dematching unit associated with respective data processing operations;
    as many single-port memories as the number of data processing operations, the single-port memories being included in one buffer; and
    control means for controlling the single-port memories,
    wherein the control means exercise control so as to cause access to the single-port memories conducted by respective data processing means to be conducted with respect to different single-port memories in accordance with a predetermined sequence, and
    if a change occurs in the sequence of access in processing of any data processing means and access contention occurs between the data processing means involving the change and another data processing means, access of one data processing means is given priority over access of the other data processing means.

2. The data processing apparatus according to claim 1, wherein
    each of the number of the data processing means and the number of the single-port memories is two, and
    one of the single-port memories is a memory for even address, whereas the other of the single-port memories is a memory for odd address.

3. The data processing apparatus according to claim 1, wherein the buffer comprises:

an address generation unit which generates an address to access the single-port memories on the basis of an order given by the control means; and switches which conduct selection for the single-port memories on the basis of an order given by the address generation unit.

4. The data processing apparatus according to claim 1, wherein the access contention occurs, when the rate dematching unit inserts dummy data in a location of data thinned on a transmitting side, or deletes data repeated on the transmitting side.

5. A mobile telephone apparatus comprising a data processing apparatus according to claim 1.

6. A data processing method used in a receiving side data processing apparatus of a HARQ processing apparatus for executing a plurality of data processing steps simultaneously, the data processing method comprising:

a plurality of data processing steps comprising a HARQ synthesis step and a rate dematching step for conducting respective data processing operations; and a control step of controlling as many single-port memories as the number of the data processing operations, the single-port memories being included in one buffer, wherein at the control step, control is exercised so as to cause access to the single-port memories conducted in respective data processing steps to be conducted with respect to different single-port memories in accordance with a predetermined sequence, and if a change occurs in the sequence of access in processing in any data processing step and access contention occurs between the data processing step involving the change and another data processing step, access for one data processing step is given priority in the control step over access for the other data processing step.

7. The data processing method according to claim 6, wherein each of the number of the data processing steps and the number of the single-port memories is two, and one of the single-port memories is a memory for even address, whereas the other of the single-port memories is a memory for odd address.

8. The data processing method according to claim 6, wherein the access contention occurs, when dummy data is inserted in a location of data thinned on a transmitting side, or data repeated on the transmitting side is deleted, at the rate dematching step.

9. A computer-readable medium carrying a data processing program product used in a receiving side data processing apparatus of a HARQ processing apparatus which causes a computer to execute a plurality of data processing simultaneously, the data processing program product comprising:

a plurality of data processing steps comprising a HARQ synthesis step and a rate dematching step for conducting respective data processing operations; and a control step of controlling as many single-port memories as the number of the data processing operations, the single-port memories being included in one buffer, wherein at the control step, control is exercised so as to cause access to the single-port memories conducted in respective data processing steps to be conducted with respect to different single-port memories in accordance with a predetermined sequence, and if a change occurs in the sequence of access in processing in any data processing step and access contention occurs between the data processing step involving the change and another data processing step, access for one data processing step is given priority in the control step over access for the other data processing step.

10. The data processing program product according to claim 9, wherein each of the number of the data processing steps and the number of the single-port memories is two, and one of the single-port memories is a memory for even address, whereas the other of the single-port memories is a memory for odd address.

11. The computer-readable medium carrying a data processing program product according to claim 9, wherein the access contention occurs, when dummy data is inserted in a location of data thinned on a transmitting side, or data repeated on the transmitting side is deleted, at the rate dematching step.

* * * * *